A. J. GUSTIN.

APPARATUS FOR CARRYING RAILROAD-RAILS.

No. 7,898. Reissued Oct. 2, 1877.

WITNESSES:

W. W. Hollingsworth

Geo. W. Hanson

INVENTOR:

Andrew J. Gustin

BY

ATTORNEYS.

UNITED STATES PATENT OFFICE.

ANDREW J. GUSTIN, OF ST. ALBANS, VERMONT.

IMPROVEMENT IN APPARATUS FOR CARRYING RAILROAD-RAILS.

Specification forming part of Letters Patent No. 190,211, dated May 1, 1877; Reissue No. 7,898, dated October 2, 1877; application filed July 12, 1877.

*To all whom it may concern:*

Be it known that I, ANDREW J. GUSTIN, of St. Albans, in the county of Franklin and State of Vermont, have invented a new and Improved Apparatus for Carrying Railroad-Rails; and I do hereby declare that the following is a full, clear, and exact description of the same, reference being had to the accompanying drawing, forming part of this specification, in which—

Figure 1:
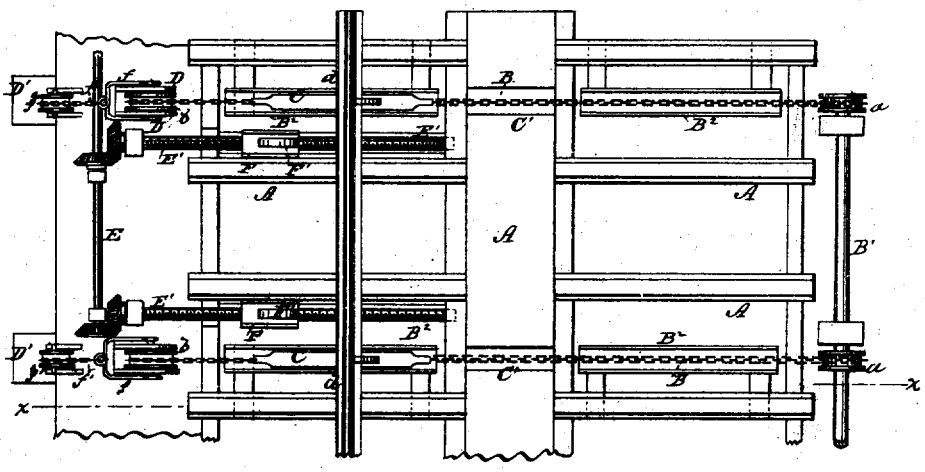
Figure 2:
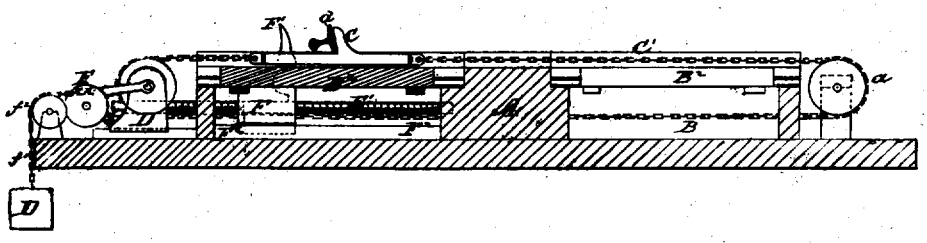

Figure 1 represents a top view, and Fig. 2 a vertical longitudinal section, on line *x x*, Fig. 1, of my improved apparatus for conveying rails to the cooling-bed.

This invention has reference to an improved apparatus by which the rails are taken up and conducted to the cooling-bed after having been passed through the bending-rolls that impart the proper camber, so as to compensate for the unequal shrinkage of the rail while becoming cold, and also for moving the rails *en masse* from the position where they are left to cool to the end where they are taken off to the straightening-machine; and the invention consists of a bed-frame with lateral chains and rail-carrying shoes, the chains and shoes being guided in grooved rails flush with the bearing-rails of the bed, and the chains automatically adjusted to expansion and contraction by movable and weighted pulley-bearings; also, two long screws with suitable bearings at the ends, and dogs shaped to fit the screws, and guided in grooves to hold them in position. The dogs are provided with trip-latches, and the screws are connected with reversible driving-shaft with gears.

In the drawing, A represents the cooling-bed, which is constructed of a length to correspond with the length of the rail, and of proper width for the convenient storing of a suitable number of rails. The bed A is made of a number of longitudinal rails, with a lateral center plate or bed, to which the rails are delivered from the bending-rolls. At both sides of the bed, and at right angles to the direction in which the rails are moved from the bending-rolls to the bed, are arranged endless chains B, that are set in motion by pulleys *a* of a revolving shaft, $B^1$, at one end, and stretched over pulleys *b* at the other end of bed A. The chains B run in grooves of guide-rails $B^2$, and in grooves C′ of the center plate of bed A, so as to be on a level with the bed, and have no projecting parts that interfere with or take hold of any rail when placed into position on the cooling-bed. The chains B are provided with smooth links or shoes C, whose upper surfaces are arranged upon a level with the surface of the bed, and have projecting catches *d* for engaging the rails when delivered on the center plate and carrying the same toward either end of the bed.

The first rails are carried to the extreme end of the bed, and stored thereon parallel to each other, the shoes being returned every time to the center plate until one side of the bed is filled. The shoes are then moved to the other side of the frame, and the rails laid up there in similar manner for cooling.

The expansion and contraction of the carrying-chains are provided for by making the supports or bearings D of the stretching-pulleys *b* movable on guide-rails *e*. This is done by connecting the pulley-shafts by pivoted bails *f* and chains $f^1$ passing over fixed pulleys $f^2$ to a weight, D′, that moves, automatically, the bearings D forward as soon as the expansion of the chains commences by the influence of the heated rails. The contraction of the chains carries the sliding pulleys back, and so on, keeping the chains continually at proper tension. The rails are then, in rapid manner, carried to their proper places on the cooling-bed by a simple, effective, and readily-controlled apparatus.

When one side of the bed is filled, and it is desired to move those rails nearest the center plate to the end where they are taken off to the straightening-machine, the reversible driving-shaft E and screws E′ are started in the proper direction to move the dogs F toward the center of bed, and when they have arrived at a point between the last rail delivered and the center plate the trip-latches F′ will assume an upright position, and when the motion of the screws E′ is reversed the dogs will move from the center to the end, and the latches, engaging with the rails, carry them *en masse* to the end of the bed.

The screws may be made long enough to extend from one extreme to the other of the bed, so as to move the rails off either end, or independent screws and reversing-shafts used for the respective ends, as is found most convenient. The dogs are retained in position on the screws by means of grooved guide-rails $F^2$ below the screws, into which the lower parts of the dogs are fitted, so as to traverse steadily on the screws in either direction.

In relation to the feature of the sliding shoe as combined with the carrying-chains, I would state that I am aware that a carriage or truck, mounted upon wheels and having its upper surface above the level of the bed, has been heretofore used for a similar purpose in connection with a chain; but this elevated carriage, it will be seen, does not take the rails automatically off of the bed, but necessitates, by reason of its elevation above the bed, the intermediate handling or loading of the rails thereupon. I therefore disclaim this arrangement, and confine my invention with respect to this feature to the shoes, links, or carriers having their upper surfaces at or below the level of the bed, so as to remove the rails automatically by sliding them along the bed, and thus dispense with this intermediate handling or loading of the same.

Having thus described my invention, what I claim as new is—

1. The sliding shoes, links, or carriers C, provided with projecting catches, in combination with the guide-rails $B^2$, the bed A, and suitable carrying and actuating devices, arranged substantially as described, whereby the upper surfaces of the shoes are located at or below the level of the bed, as and for the purpose set forth.

2. The shoes, links, or carriers C, having their upper surfaces arranged at or below the level of the bed, and provided with projecting catches, in combination with the bed, the driving-chains, and the guide-rails $B^2$, substantially as and for the purpose described.

3. The combination, with an endless chain, B, subject to expansion by hot rails, of a pulley, *b*, arranged in a slide-bearing, D, held by a movable weight, as shown and described.

4. The combination of the guides F with the screws, dogs, and latches for carrying the rails *en masse*, and operated substantially in the manner described.

ANDREW J. GUSTIN.

Witnesses:
WILBUR P. DAVIS,
GEO. C. ELLSWORTH.